United States Patent
Hu et al.

(10) Patent No.: US 10,922,522 B2
(45) Date of Patent: Feb. 16, 2021

(54) FINGER VEIN RECOGNITION SYSTEM

(71) Applicant: NXP USA, INC., Austin, TX (US)

(72) Inventors: Yuyun Hu, Shanghai (CN); Xiaopeng Chen, Tianjin (CN); Kai Zhu, Shanghai (CN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/438,440

(22) Filed: Jun. 11, 2019

(65) Prior Publication Data
US 2020/0311370 A1    Oct. 1, 2020

(30) Foreign Application Priority Data
Apr. 1, 2019    (CN) .......................... 201910254813.6

(51) Int. Cl.
*G06K 9/00*    (2006.01)
*G06K 9/20*    (2006.01)

(52) U.S. Cl.
CPC ....... *G06K 9/0004* (2013.01); *G06K 9/00087* (2013.01); *G06K 9/00885* (2013.01); *G06K 9/2027* (2013.01); *G06K 2009/00932* (2013.01)

(58) Field of Classification Search
CPC ..... G06K 2009/00932; G06K 9/00013; G06K 2009/0006; G06K 9/00; G06K 9/00885; G06K 9/00006; G06K 9/2027; G06K 9/00087
USPC .................................................. 271/115, 124
See application file for complete search history.

(56) References Cited

U.S. PATENT DOCUMENTS

| | | | |
|---|---|---|---|
| 8,300,897 B2 | 10/2012 | Nagasaka et al. | |
| 8,509,495 B2 | 8/2013 | Xu et al. | |
| 8,805,028 B2 | 8/2014 | Miura et al. | |
| 8,855,376 B2 | 10/2014 | Miura et al. | |
| 9,558,392 B2 | 1/2017 | Park et al. | |
| 2007/0058841 A1* | 3/2007 | Miura ................... | E05B 81/76 382/115 |
| 2010/0067757 A1* | 3/2010 | Arai ..................... | G06K 9/0004 382/128 |
| 2016/0026840 A1* | 1/2016 | Li ........................ | G06K 9/0002 348/77 |
| 2016/0267337 A1 | 9/2016 | Bofinger et al. | |
| 2018/0179786 A1 | 6/2018 | Johnson | |
| 2020/0151480 A1* | 5/2020 | Min ..................... | G06K 9/2036 |

FOREIGN PATENT DOCUMENTS

| | | |
|---|---|---|
| JP | 2008093143 | 4/2008 |
| WO | 2017010943 | 1/2017 |

OTHER PUBLICATIONS

Liukui Chen et al., "A Finger Vein Image-Based Personal Identification System With Self-Adaptive Illuminance Control", IEEE Transactions on Instrumentation and Measurement, vol. 66, No. 2, Feb. 2017.

* cited by examiner

*Primary Examiner* — Koosha Sharifi-Tafreshi

(57) ABSTRACT

A finger vein recognition system includes an IR camera, a handle with a sensor and a IR LED array, and a microprocessor for controlling the LED array and processing image signals received from the camera. The luminescence of each LED in the LED array can be changed based on the position of a user's fingers and the environment, which improves the quality of images captured by the IR camera. The sensor detects the proximity of a user and activates the system.

19 Claims, 3 Drawing Sheets

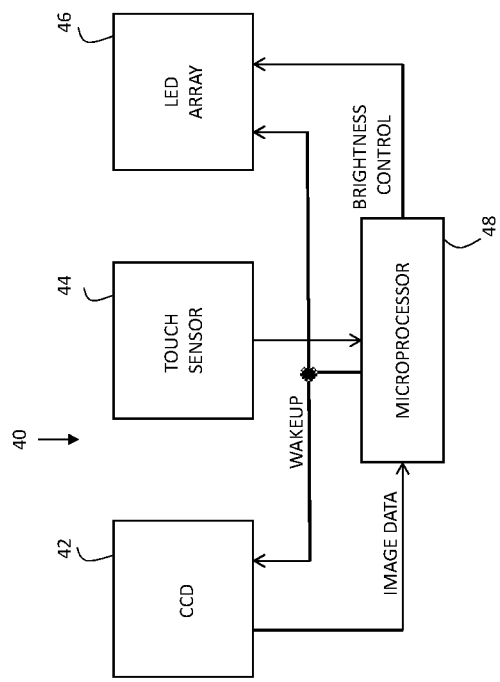
FIG. 4
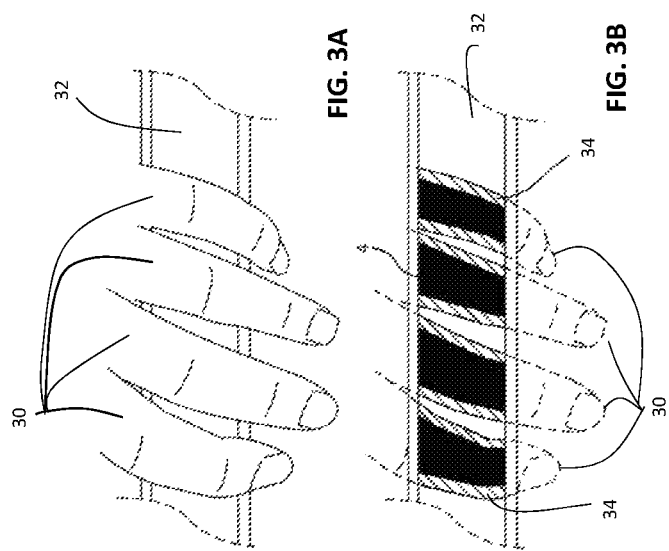
FIG. 3A
FIG. 3B

FINGER VEIN RECOGNITION SYSTEM

BACKGROUND

The present invention relates generally to image acquisition systems, and, more particularly, to a device for finger vein image acquisition and recognition.

Biometric recognition, or simply biometrics, involves the use of distinctive anatomical and behavioral characteristics, such as finger prints, palm prints, faces, irises, voices, and gait, for personal identification. Biometrics are used not only for identification, but also in security systems for allowing entry or access to secure areas such as computer files and databases, laboratories and offices, and even homes and automobiles, since biometrics are more convenient than traditional methods like keys or ID cards or passwords and PINs, which require either a physical object to be carried or a phrase or code to be remembered.

Within biometrics, finger vein identification is becoming more popular because it can be more secure than other recognition systems (finger or palm prints, faces, and irises). In finger vein recognition systems, invisible light is passed through the finger and a camera is used to capture an image of the veins illuminated by the light. The captured image is then compared to known patterns for identification. Unlike the other biometrics, the vein pattern is hidden beneath the skin, which makes it much more difficult to alter or spoof.

Accordingly, it would be advantageous to have an accurate and reliable finger vein recognition system.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

FIG. 3A illustrates fingers being placed on the door handle of either of the systems of FIG. 1B or 2B, and FIG. 3B illustrates finger positions being detected;

FIG. 4 is a schematic block diagram of a vein recognition system in accordance with an embodiment of the present invention.

DETAILED DESCRIPTION

Figure 1A:
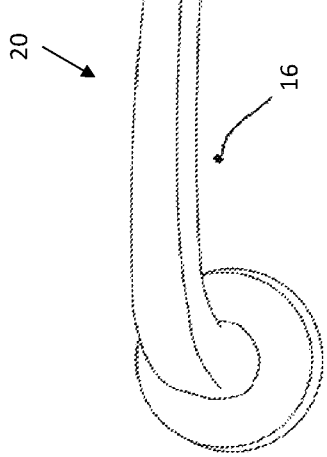
FIG. 1A shows an example of a vein recognition system where an image sensor of the system is installed in an automobile door and FIG. 1B shows a lighting system of the vein recognition system disposed on an inner side of a door handle of the automobile of FIG. 1A.

The detailed description of the appended drawings is intended as a description of the currently preferred embodiments of the present invention and is not intended to represent the only form in which the present invention may be practiced. It is to be understood that the same or equivalent functions may be accomplished by different embodiments that are intended to be encompassed within the spirit and scope of the present invention.

In one embodiment, the present invention provides a finger vein recognition system that includes an image capture device, an array of lights, and a microprocessor. The image capture device is attached to a first surface and the array of lights is attached to a second surface in facing arrangement with the first surface and the image capture device. The microprocessor is electrically connected to the image capture device and the array of lights and is configured to individually adjust an intensity of each of the lights of the array of lights. The microprocessor receives image data from the image capture device and processes the image data to detect finger vein patterns therein.

In another embodiment, a touch sensor is associated with at least one of the second surface and the array of lights. The touch sensor senses the presence of a user and transmits a touch signal to the microprocessor indicating the presence of the user. The microprocessor then generates and sends a wakeup signal to the image capture device and the array of lights in response to the touch signal. The wakeup signal turns on the array of lights and the image capture device.

In yet another embodiment, the present invention provides a method of recognizing veins in one or more fingers of a user. The method includes the steps of turning on a whole array of lights, where the array of lights is located on an inner side of a door handle and illuminates the one or more fingers of the user, and turning on an image capture device, where the image capture device is located on a door associated with the door handle and is in facing relationship with the array of lights. The image capture device then captures images of the one or more fingers. The captured images are analyzed to determine positions of the one or more fingers and a brightness of individual ones of the lights of the array of lights is adjusted in response to determining the positions of the one or more fingers. Additional images of the one or more fingers are captured after adjusting the brightness, and the additional images are analyzed to determine finger vein patterns of the one or more fingers. The determined finger vein patterns are compared with one or more known finger vein patterns stored in a database. If there is a pattern match, then the door may be opened and if there is not a match, the door will remain closed.

Various embodiments of the present invention provide a finger vein recognition system including a sensor, such as a touch or motion sensor that wakes up an image capture device and a light array. The intensity of individual lights of the light array may be adjusted by a microprocessor, which allows the image capture device to obtain high quality finger vein images.

Referring now to FIG. 1A, an example of a finger vein recognition system 10 integrated with an automobile door 12 and door handle 14 is shown. FIG. 1A shows an image capture device 16 of the system 10 is installed in the door 12 such that the image capture device 16 is focused on a backside of the door handle 14. In the presently preferred embodiment, the image capture device 16 comprises a Charge Coupled Device (CCD).

Figure 1B:
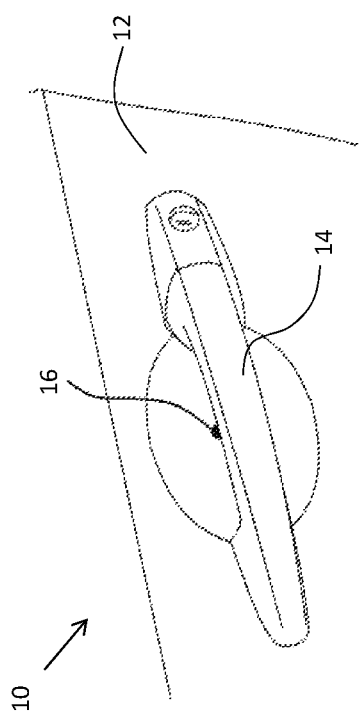

FIG. 1B shows a lighting system 18 of the finger vein recognition system 10 disposed on the backside of the door handle 14 such that the lighting system 18 is in facing relationship with the image capture device 16. In the presently preferred embodiment, the lighting system 18 comprises an array of Light Emitting Diodes (LEDs) that emit near-infrared light. The finger vein recognition system 10 uses near-infrared light emitted by the array of LEDs to illuminate one or more fingers of a human, where the light from the LEDs penetrates the fingers and is absorbed by the hemoglobin in the blood. And since the hemoglobin is located in the veins, images of the veins are captured by the image capture device 16. The light from the LEDs may have of a wavelength between 740 nm and 960 nm, and preferably is around 850 nm. However, as will be understood by those of skill in the art, far-infrared light also could be used. Accordingly, the image capture device 16 includes an optical filter configured to allow only light with a specific wavelength (e.g., 850 nm) incident from the lighting system 18. Both the image capture device 16 and the lighting system 18 receive power using an existing wiring harness disposed within the door 12. And as will be discussed in more detail below, the image capture device 16 and the lighting system 18 may be in communication with a microprocessor also using the existing wiring harness.

Figure 2A:
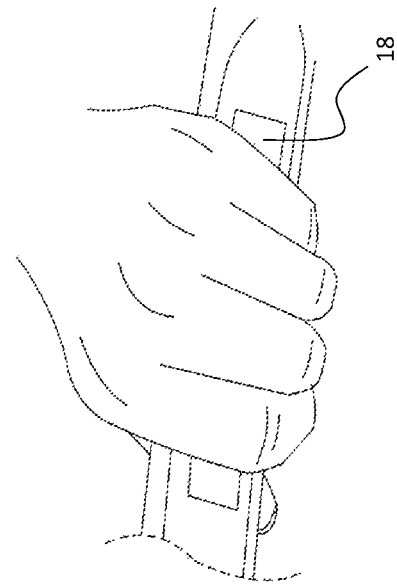
FIG. 2A shows an example of the vein recognition system of FIG. 1A where the image sensor of the system is installed on a door of an office building and FIG. 2B shows a lighting system of the vein recognition system disposed on an inner side of a door handle of the door of FIG. 2A.
Figure 2B:
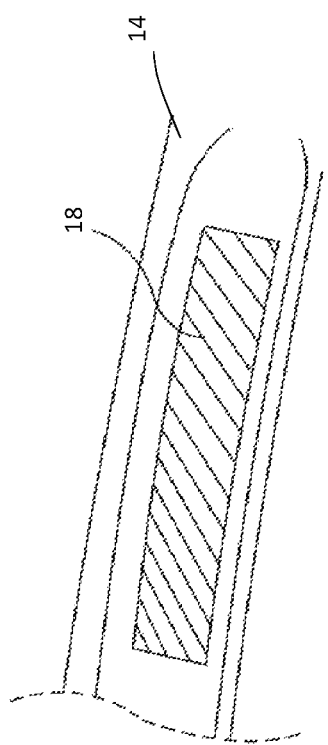

FIG. 2A shows an example of the finger vein recognition system 10 of FIG. 1A where the image capture device 16 is installed on a door 20 of an office, room, laboratory or building, and FIG. 2B shows the lighting system 18 attached to a door knob or handle 22 associated with the door 20.

FIG. 3A illustrates four fingers 30 being placed on a door handle 32, which may be one of the door handles 12 or 22 shown in FIGS. 1B and 2B, and FIG. 3B illustrates finger positions being detected by the image capture device and then specific ones of the LEDs 34 being illuminated in order to capture images of the veins in the fingers 30. The LEDs are individually controlled to allow for adequate brightness to capture good quality images of the veins in one or more fingers.

FIG. 4 is a schematic block diagram of a finger vein recognition system 40 in accordance with an embodiment of the present invention. The system 40 comprises a CCD 42, a touch sensor 44, a LED array 46, and a microprocessor 48. As shown in FIGS. 1A and 2A, the CCD 42 is disposed in facing relationship with a backside of a door handle and the LED array 46 is disposed on the backside of the door handle so that when a user wraps his or her fingers around the door handle, the fingers traverse the LED array 46. The LED array 46 illuminates the finger veins and the CCD 42 captures images of the finger veins.

The microprocessor 48 is electrically connected to the CCD 42 and the LED array 46 and controls an intensity of each of the lights of the array of lights. The microprocessor 48 receives image data from the CCD and processes the image data to detect finger vein patterns therein. The microprocessor 48 may be a S32 OR I.MX series microcontroller available from NXP Semiconductors, of Eindhoven, Netherlands. In one embodiment, the microprocessor 48 comprises a NXP® MCIMX8QXP MPU, which is often used in automotive applications. As will be discussed in more detail with reference to FIG. 5, the microprocessor 48 includes a local memory for storing known image data that is used to compare to the image data captured by the CCD 42 to detect a match condition. If the captured image data matches the prestored image data, then the door may be opened by the user. The local memory should be large enough to store the known finger vein image of at least one authorized user, but in most embodiments, a plurality of users' finger vein image data may be stored in the memory. That is, the memory includes a database of user image data. It will be understood by those of skill in the art that the stored image data may be in the form of a mathematical template or vector that represents the image and the size of the vector is set to an appropriate size, such as 256 or 512 bytes, to make efficient use of the memory space if the memory size is limited.

Although it is preferred that the image data for authorized users is stored in a local memory of the microprocessor 48, it will be understood by those of skill in the art that the microprocessor 48 could be connected to a network to access image data stored in a non-local memory, such as in the cloud. In one embodiment, a match condition causes the microprocessor 48 to transmit an unlock signal to the door, which is then unlocked.

The finger vein recognition system 40 also includes a sensor 44 proximate to the door handle. In one embodiment, the sensor 44 comprises a touch sensor, which when touched (by a user) sends a touch signal to the microprocessor 48. In other embodiments, other types of sensors may be used, such a motion sensor or a RFID sensor that detects an RFID signal transmitted from a key fob or the like (e.g., an IOT device worn by a user). If the microprocessor 48 is in a sleep, idle, or low power mode, the touch signal acts to wake the processor 48. The processor 48 then sends a wakeup signal to the CCD 42 and the LED array 46 to activate the CCD 42 and the LED array 46. The sensor 44 preferably is associated with at least one of the door handle and the LED array 46 for detecting the presence of a hand of a user.

Figure 5:
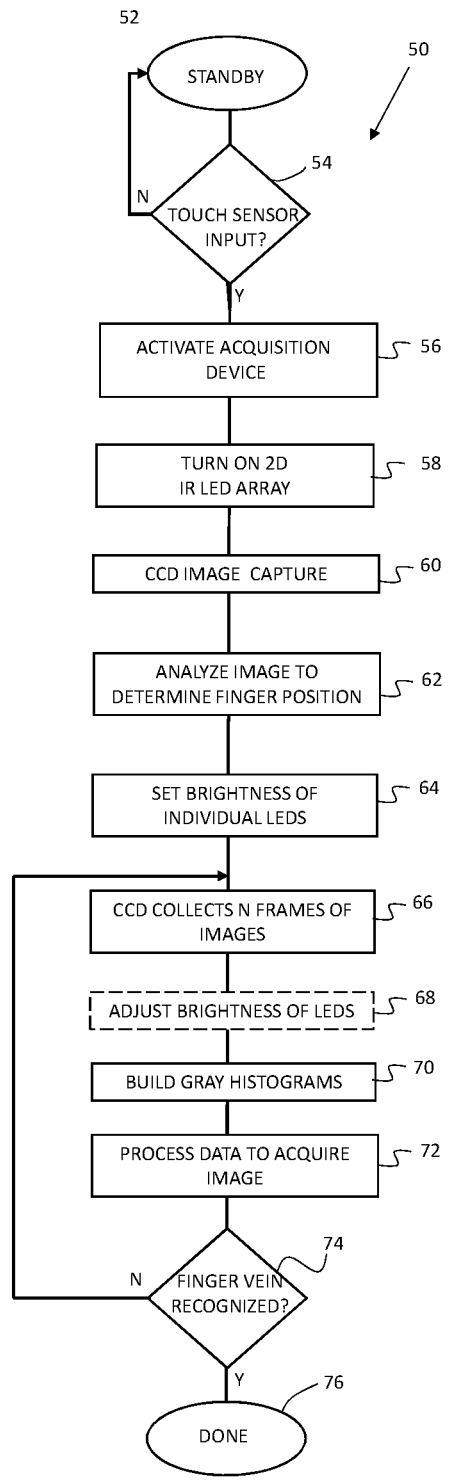
FIG. 5 is a flow chart of a method of recognizing finger veins in accordance with an embodiment of the present invention.

FIG. 5 is a flow chart of a method 50 of recognizing finger veins in accordance with an embodiment of the present invention. Starting in an idle or standby state 52, as discussed above, the system is awakened by a sensor that detects the presence of a user, such as a touch sensor. At step 54, if the touch sensor detects the presence of a user, then step 56 is executed, otherwise, the system remains in a standby state. At step 56, the microprocessor sends a wakeup signal to the CCD and the LED array. At step 58, the LED array is turned on and at step 60, when the user places his or her fingers over the LED array, the CCD captures images of the fingers and sends this initial image data to the microprocessor.

The initial image data is analyzed by the microprocessor to determine the finger positions in relation to the LED array at step 62 and then at step 64, the microprocessor adjusts the brightness of the diodes that are located beneath the fingers (as illustrated in FIG. 3B). In this way, the fingers and thus the finger veins of the user will be well lit so that high quality image data may be captured by the CCD. Further, by individually adjusting LED brightness, those veins that are deeper in the finger may be captured as well as the veins closer to the skin, making for a very secure system.

At step 66, the CCD captures images of the veins of two or more fingers of a user. At steps 70 and 72, the image data captured by the CCD is processed by the microprocessor to transform the data into a form where it can be compared to image data prestored in a database. That is, the CCD continuously collects N frames of images at step 66, and simultaneously adjusts the brightness of the individual LEDs at step 68 so that gray histograms of the finger regions are uniformly distributed. Images with higher quality then are averaged and the averaged image is processed using an AND operation with the finger position data to obtain an acquisition image.

At step 74, the processed image data is compared to one or more images stored in a database. For example, for an automobile, there may be only 2 or 3 authorized users, so the microprocessor need only store the finger vein data for 2 or 3 different users. Thus, the comparison can be performed very quickly. In a presently preferred embodiment, the system captures the images of two or more fingers and then compares the captured data to known images of two or more fingers. For example, the system could use data from the index finger and the middle finger, which would make the system much more secure than if it just used the data for the index finger. Alternatively, the image data for two fingers could be captured and compared, but a match could require only one of the captured finger vein images to match. If there is a match, then at step 76 the door is unlocked (i.e., the microprocessor sends an unlock signal to a door lock module) and if there is not a match, the door will remain locked and the system will either continue to collect images to improve on the picture quality or will timeout and return to the standby state.

The system 100 provides the advantages of being asleep or idle until activated by a sensor signal. Another advantage is that configuring the microprocessor to individually adjust the brightness of the LEDs allows high quality images to be obtained, where veins deeper below the skin may be imaged, not just the veins close to the surface of the skin, which makes for a secure and accurate system.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A finger vein recognition system, comprising:
an image capture device attached to a first surface;
an array of lights attached to a second surface that is in facing arrangement with the first surface and the image capture device; and
a microprocessor electrically connected to the image capture device and the array of lights, wherein
an intensity of each of the lights of the array of lights is adjustable by the microprocessor,
the microprocessor receives first image data from the image capture device and processes the first image data to determine finger positions,
the microprocessor receives second image data from the image capture device and processes the second image data to detect finger vein patterns therein, and
the second image data comprises
a plurality of image frames captured by the image capture device while simultaneously adjusting brightness of individual lights of the array of lights,
said simultaneously adjusting the brightness is performed such that a gray histogram of finger positions have a uniform distribution, and
the plurality of image frames are averaged to generate the second image data.

2. The finger vein recognition system of claim 1, further comprising:
a sensor associated with at least one of the second surface and the array of lights for detecting the presence of a hand of a user, wherein
the sensor is electrically connected to the microprocessor and transmits a touch signal thereto,
the microprocessor generates and sends a wakeup signal to the image capture device and the array of lights in response to the touch signal, and
the wakeup signal turns on the array of lights and the image capture device.

3. The finger vein recognition system of claim 1, wherein the image capture device comprises a CCD camera.

4. The finger vein recognition system of claim 3, wherein the image capture device includes an optical filter configured to allow only light incident from the array of lights with a specific wavelength therethrough.

5. The finger vein recognition system of claim 4, wherein the array of lights comprises an array of Light Emitting Diodes (LEDs) that emit near-infrared light.

6. The finger vein recognition system of claim 1, wherein the array of lights comprises an array of Light Emitting Diodes (LEDs) that emit near-infrared light.

7. The finger vein recognition system of claim 1, wherein the first surface comprises a door and the second surface comprise a door handle or knob.

8. The finger vein recognition system of claim 7, wherein the first surface comprises an automobile door and the second surface comprise an automobile door handle.

9. The finger vein recognition system of claim 1, wherein the image capture device captures images of the veins of two or more fingers of a user and the microprocessor compares the captured images of the two or more fingers to finger vein images stored in a database.

10. The finger vein recognition system of claim 9, wherein the database comprises one or more images stored in a local memory of the microprocessor.

11. A finger vein recognition system, comprising:
an image capture device attached to a first surface;
an array of lights attached to a second surface that is in facing arrangement with the first surface and the image capture device;
a microprocessor electrically connected to the image capture device and the array of lights, wherein
an intensity of each of the lights of the array of lights is adjustable by the microprocessor, and
the microprocessor receives image data from the image capture device and processes the image data to detect finger vein patterns therein,
processing the image data comprises
capturing a plurality of image frames by the image capture device while simultaneously adjusting the intensity of the lights of the array of lights,
performing said simultaneous adjusting the brightness such that a gray histogram of finger positions have a uniform distribution,
averaging the plurality of image frames to generate the processed image data; and
a touch sensor associated with at least one of the second surface and the array of lights, wherein
the touch sensor is electrically connected to the microprocessor and transmits a touch signal thereto,
the microprocessor generates and sends a wakeup signal to the image capture device and the array of lights in response to the touch signal, and
the wakeup signal turns on the array of lights and the image capture device.

12. The finger vein recognition system of claim 11, wherein the image capture device comprises a CCD camera.

13. The finger vein recognition system of claim 12, wherein the image capture device includes an optical filter configured to allow only light incident from the array of lights with a specific wavelength to pass therethrough.

14. The finger vein recognition system of claim 13, wherein the array of lights comprises an array of Light Emitting Diodes (LEDs) that emit near-infrared light.

15. The finger vein recognition system of claim 11, wherein the first surface comprises a door and the second surface comprise a door handle or knob.

16. A method of recognizing veins in one or more fingers of a user, comprising the steps of:

turning on all of the lights in an array of lights, wherein the array of lights is located on an inner side of a door handle and illuminates the one or more fingers of the user;

turning on an image capture device, wherein the image capture device is located on a door associated with the door handle and is in facing relationship with the array of lights, and capturing images of the one or more fingers;

analyzing the captured images to determine positions of the one or more fingers;

adjusting a brightness of individual ones of the lights of the array of lights in response to determining the positions of the one or more fingers;

capturing additional images of the one or more fingers after adjusting the brightness, wherein said adjusting the brightness is performed such that a gray histogram of the additional images have a uniform distribution;

analyzing the additional images to determine finger vein patterns of the one or more fingers of the user, wherein said analyzing the additional images comprises averaging the additional images;

comparing the determined finger vein patterns with one or more known finger vein patterns stored in a database; and preventing and allowing the door to be opened in response to the comparing.

17. The method of claim 16, further comprising the steps of:

a sensor detecting the presence of the user and generating a touch signal;

the microprocessor receiving the touch signal from the sensor and generating a wakeup signal; and the image capture device and the light array receiving the wakeup signal and being activated in response thereto.

18. The method of claim 16, wherein the image capture device captures images of the veins of two or more fingers of a user and the microprocessor compares the captured images of the two or more fingers to finger vein images stored in a database.

19. The method of claim 18, wherein the database comprises image data stored in a local memory of the microprocessor.

* * * * *